United States Patent [19]
Brunnett et al.

[11] 3,777,145
[45] Dec. 4, 1973

[54] AUTOMATIC LIMIT SWITCH SYSTEM FOR A SCINTILLATION DEVICE AND METHOD OF OPERATION

[75] Inventors: Carl J. Brunnett, Mayfield Heights; Basil N. Ioannou, Bedford, both of Ohio

[73] Assignee: Picker Corporation, Cleveland, Ohio

[22] Filed: June 23, 1972

[21] Appl. No.: 265,624

[52] U.S. Cl. ...250/303, 307/223, 250/362, 250/491
[51] Int. Cl. ............................................. G01j 39/18
[58] Field of Search ................. 250/71.5 S; 307/223

[56] References Cited
UNITED STATES PATENTS
R26,014   5/1966   Stickney ........................ 250/71.5 S
3,465,145   9/1969   Leiter ............................ 250/71.5 S Primary Examiner—James W. Lawrence
Assistant Examiner—Harold A. Dixon
Attorney—Henry W. Collins et al.

[57] ABSTRACT

A scintillation scanner having an automatic limit switch system for setting the limits of travel of the radiation detection device which is carried by a scanning boom. The automatic limit switch system incorporates position responsive circuitry for developing a signal representative of the position of the boom, reference signal circuitry for developing a signal representative of a selected limit of travel of the boom, and comparator circuitry for comparing these signals in order to control the operation of a boom drive and indexing mechanism.

14 Claims, 2 Drawing Figures

PATENTED DEC 4 1973 3,777,145

AUTOMATIC LIMIT SWITCH SYSTEM FOR A SCINTILLATION DEVICE AND METHOD OF OPERATION

CROSS REFERENCES TO RELATED PATENTS AND PATENT APPLICATIONS

U.S. Pat. No. Re 26,014, to Joseph B. Stickney et al., entitled, "Scintillation Scanner," issued on May 3, 1966, and assigned to the assignee of the present application.

U.S. Pat. No. 3,159,744, to Joseph B. Stickney et al., entitled, "Scintillation Scanner Photo-Circuit," issued on Dec. 1, 1964, and assigned to the assignee of the present application.

U.S. Pat. application Ser. No. 660,823, to Carl J. Brunnett et al., entitled, "Scintillation Recording Device," filed on Aug. 15, 1967, and assigned to the assignee of the present application.

U.S. Patent application Ser. No. 156,913, to Carl J. Brunnett et al., entitled "High Speed Color Printer for Scintillation Scanner," filed June 25, 1971, and assigned to the assignee of the present application.

U.S. Pat. application Ser. No. 156,912 to Carl J. Brunnett et al., entitled "Automatic Calibration System for a Scintillation Device and Method of Operation," filed June 25, 1971, and assigned to the assignee of the present application.

U.S. Patent application Ser. No. 265,625 to Carl J. Brunnett et al., entitled "Automatic Dot Factor System for a Scintillation Device and Method of Operation," filed June 23, 1972, and assigned to the assignee of the present application.

U.S. Pat application Ser. No. 265,481 to Carl J. Brunnett et al., entitled "Information Density Indicator for Digital Scanner and Method of Operation," filed June 23, 1972, and assigned to the assignee of the present application.

BACKGROUND OF THE INVENTION

This invention pertains to the art of scintillation devices for providing graphical presentations of the level of radioactivity over an area, and more particularly, a control system for automatically limiting the distance of travel of a boom which carries a radiation detection device in a scintillation scanner.

In the above-referenced patents to Stickney et al., a scintillation device of the type which is generally referred to as a scintillation scanner is disclosed. Generally, in the operation of a scintillation scanner, a scintillation probe is supported on a boom which reciprocates along a series of parallel rectilinear paths to cover a predetermined area of examination. A light source and a stylus are also carried by the boom to reciprocate along paths of travel which correspond to and are parallel to the path of travel of the probe. The light source and stylus are coupled through appropriate circuitry to the scintillation probe to produce graphic images formed by a pattern of dots, on both a film and a sheet of paper, of the levels of radiation activity being measured.

In the medical use of a scintillation scanner, a radioactive isotope is administered to a patient. Isotopes exhibit the characteristic of concentrating in certain types of tissue with the level of concentration dependent upon the type of tissue. These different levels of concentration result in different levels of radiation activity which, when measured and graphically presented, provide a basis for medical diagnosis. The levels of concentration of the isotopes are not only different in different tissues of a single organ, but are also different between similar tissues in similar organs. For this reason, the levels of maximum concentration, or maximum radiation activity, may vary over a wide range for different organs or even for two similar organs.

In the above-referenced Patent to Stickney et al. No. 3,070,695, the disclosed scintillation device includes a drive mechanism for reciprocating the boom, as well as indexing the boom once the boom has reached a limit of travel. This patent also discloses a circuit for controlling operation of the drive mechanism, and includes limit switches which may be set at either limit of travel for de-energizing a reciprocal drive motor and energizing a transverse drive motor so as to terminate longitudinal movement of the boom and index the boom for reverse longitudinal movement.

With the control circuit disclosed in this patent to Stickney et al., the limit switches must be physically moved to positions corresponding to selected limits of travel of the boom. Also, it is normally necessary to de-energize the scanning drive mechanism and allow movement of the boom to terminate before adjusting or readjusting the mechanical limit of travel switches. In other words, if once a scanning operation is begun it is decided that the limits of travel of the radiation detection device should be increased or decreased due to the particular size of an organ under examination, it is normally necessary to stop the scanning operation, reset the limit switches, and commence another scanning operation. As is apparent, this procedure of terminating a scanning operation, readjusting the limit switches, and again commencing a scanning operation, is quite time consuming.

SUMMARY OF THE INVENTION

The present invention is directed toward an automatic limit of travel system for the scanning drive mechanism in a scintillation scanner and method of operation, thereby overcoming the noted disadvantages, and others, of previous systems.

One aspect of the present invention is the provision of an automatic limit switch system for setting the limits of travel of the radiation detection device which is carried by a boom in a scintillation scanner. The automatic limit switch system includes position responsive circuitry for developing a position signal representative of the position of the boom, reference signal circuitry for developing a reference signal representative of a selected position of limit of travel for the boom, and comparator circuitry for comparing these signals in order to control the operation of a boom drive and indexing mechanism.

In accordance with another aspect of the present invention the automatic limit system includes a second reference signal circuitry for developing a second reference signal representative of a selected limit of travel of the boom in an opposite direction, and a second comparator circuitry for comparing these signals in order to limit the distance of travel of the boom in this direction.

In accordance with another aspect of the present invention, the reference signal circuitry includes an oscillator circuit and counter for developing the reference signal.

DESCRIPTION OF THE PREFERRED EMBODIMENT

Figure 1:
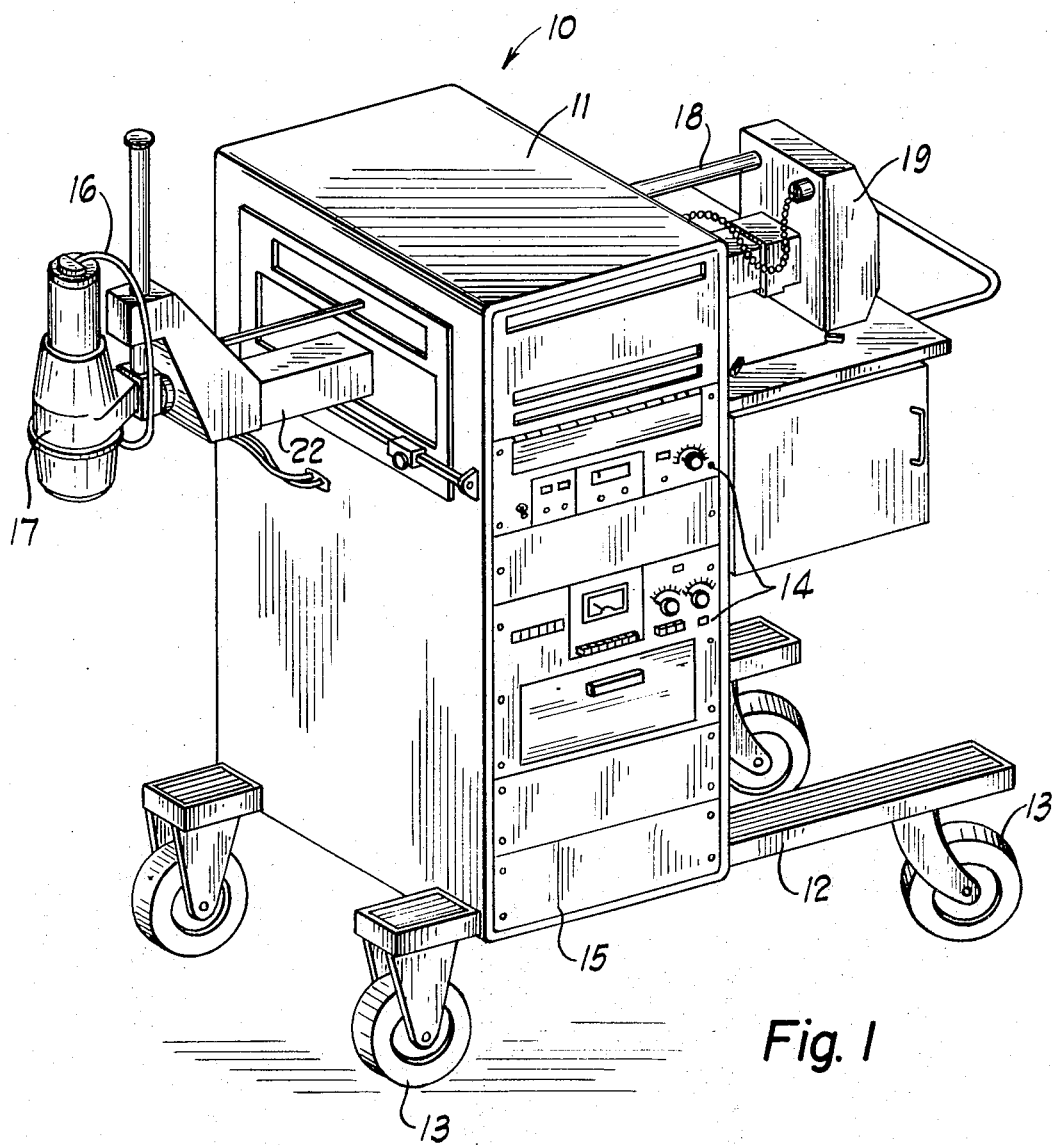
FIG. 1 is a perspective view of a scintillation scanner which may be used in conjunction with the automatic limit switch system of the present invention.

Reference is made to FIG. 1 which generally illustrates a scintillation scanner 10 including a housing 11 which is supported on a mobile base 12. A plurality of wheels 13 support the base of movement.

A plurality of control modules 14 are mounted in the housing and have front panels which are generally aligned with the front wall 15 of the housing 11. The control module 14 includes various control circuits which may be adjusted for operation by an operator. The scanner also includes a conductor 16 which transmits signals from a scintillation probe 17 to a color printer apparatus 19 to the electronic body of the instrument.

A boom 22 is supported in the upper portion of the housing 11. The boom 22 is supported for transverse and longitudinal reciprocation on a carriage structure, and, as illustrated, the boom 22 supports the scintillation probe 17 and the color printer 19. A scan and indexing control circuit for causing the boom to reciprocate longitudinally in any of a wide range of selected speeds, as well as circuitry for transversely indexing the carriage at any selected distance within a wide range of distances, is included in the control module 14.

For a more complete description of the operation of a scintillation scanner, including a description of the operation of the control circuit for controlling the movement of the boom and a description of the operation of the color printing apparatus, reference is made to the above-referenced Patents and Patent applications.

Figure 2:
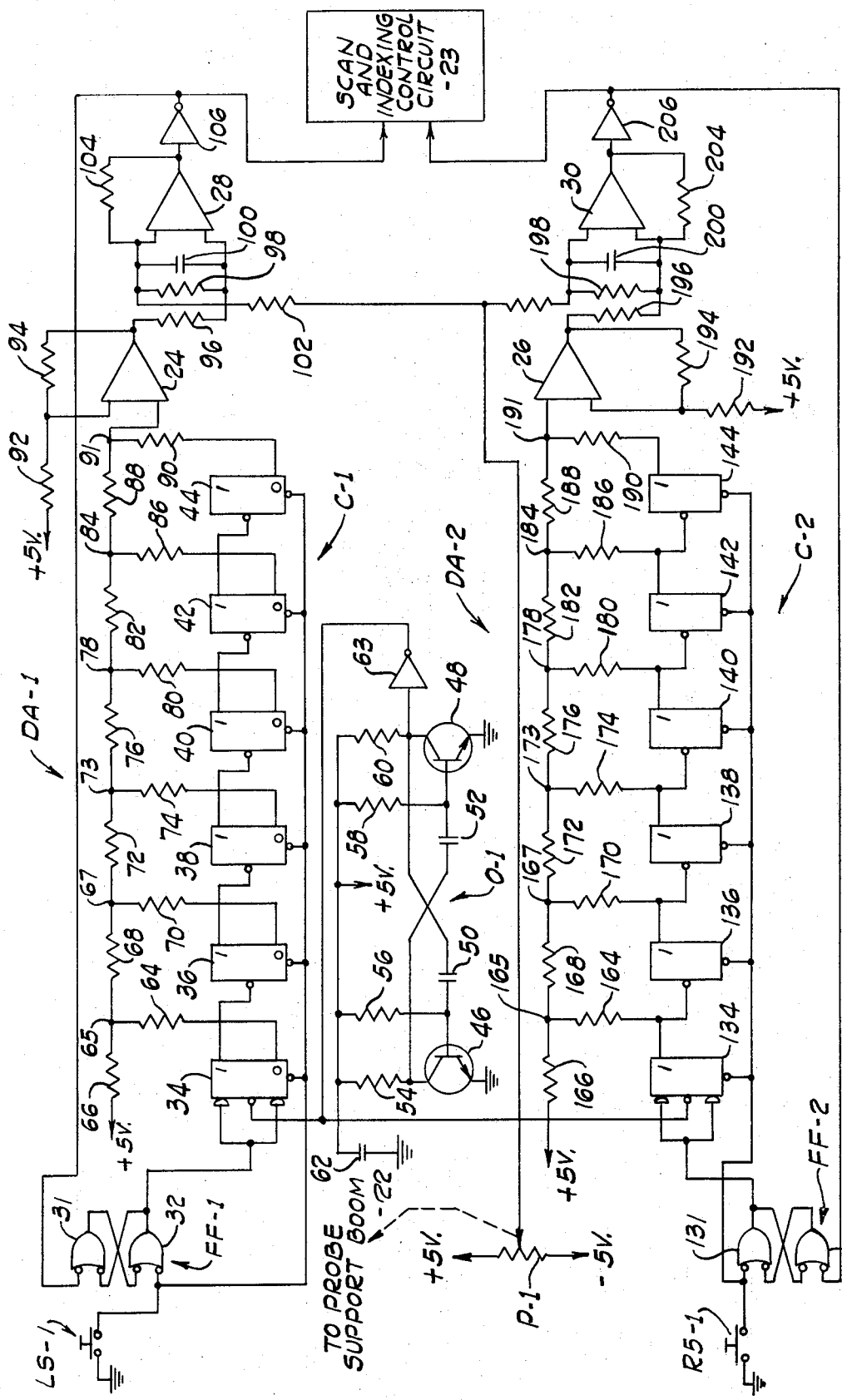
FIG. 2 is an electrical schematic diagram illustrating in detail the circuitry of the automatic limit switch system of the present invention.

As illustrated in FIG. 2, the probe support boom 22 is mechanically connected to an automatic limit switch circuit AL-1 having its output terminals connected to a scan and indexing control circuit 23. The automatic limit switch circuit includes an astable multivibrator 0-1 which is coupled to a pair of six-stage counters C-1, C-2. The output terminals of the counters C-1, C-2 are respectively coupled to a pair of digital-to-anolog converters DA-1, DA-2, and the output terminals of the digital-to- analog converters DA-1, DA-2 are respectively connected to the input terminals of a pair of amplifiers 24, 26. The output terminals of the amplifiers 24, 26 are in turn respectively connected to one of the pair of input terminals of a pair of comparators 28, 30. The other input terminals of the comparators 28, 30 are coupled to the movable contact of a positioning potentiometer P-1, and the output terminals of the comparators 28, 30 are coupled to the scan and indexing control circuit 23. The output terminals of the comparators 28, 30 are also fed back to logic circuitry including a pair of flip-flops FF-1, FF-2 for controlling the operation of the counters C-1, C-2. The flip-flops FF-1, FF-2 are actuated to initiate a counting operation by the counters C-1, C-2 by a right and left margin limit set switch LS-1, RS-2.

More particularly, the probe support boom 22 is mechanically connected to the movable contact of the potentiometer P-1. One of the stationary contacts of the potentiometer P-1 is electrically connected to a positive 5 volt supply source and the other stationary contact of the potentiometer P-1 is connected to a negative 5 volt supply source.

The left margin limit set switch LS-1 is a momentary single-pole switch having one of its terminals connected directly to ground and the other terminal connected to the "set" terminal of the flip-flop FF-1. The flip-flop FF-1 is comprised of a pair of OR gates 31, 32 each having one of its output terminals fed back to one of the input terminals of the other OR gate. The output terminal of the flip-flop FF-1 is connected to the input terminal of the counter C-1 which is comprised of six J-K flip-flops 34, 36, 38, 40, 42, 44. The output terminal of the flip-flop FF-1 is connected in common to the "J" and "K" terminals of the J-K flip-flop 34, and the 1 terminal of each of the flip-flops 34 through 42 are respectively connected to the "toggle" terminal of the following flip-flop.

The toggle terminal of the J-K flip-flop 34 is connected to the output terminal of the oscillator circuit 0-1. The oscillator circuit 0-1 takes the form of an astable multivibrator. More particulary, the oscillator circuit 0-1 includes a pair of NPN transistors 46, 48 having their emitters connected in common to ground. The base of the transistor 46 is coupled through a capacitor 50 to the collector of the transistor 48, and the base of the transistor 48 is coupled through a capacitor 52 to the collector of the transistor 46. In addition, the collector of the transistor 46, the base of the transistor 46, the collector of the transistor 48, and the base of the transistor 48, are respectively coupled through one of four resistors 54, 56, 58, 60, to a positive 5 volt supply source to properly bias the transistors for oscillation. A capacitor 62 is coupled between the positive 5 volt supply source and ground.

The output signals developed by the oscillation circuit 0-1 are obtained at the collector of the transistor 48 and are applied through an amplifier 63 to the toggle terminal of the J-K flip-flop 34. The "reset" terminals of the flip-flops 34-44 are connected in common to the set terminal of the flip-flop FF-1.

The 0 terminals of each of the flip-flops 34 through 44 are connected to the digital-to-analog converter DA-1. The digital-to-analog converter DA-1 is generally comprised of a resistive ladder network. More particularly, the 0 terminal of the flip-flop 34 is connected through a resistor 64 to a juncture point 65 between a pair of resistors 66 and 68. The other terminal of resistor 66 is connected directly to the positive 5 volt supply source, and the other terminal of the resistor 68 is connected to a juncture point 67 between another pair of resistors 70, 72.

The other terminal of the resistor 70 is connected to the 0 terminal of the flip-flop 36, and the other terminal of the resistor 72 is connected to a juncture point 73 between a pair of resistors 74, 76. The other terminal of the resistor 74 is connected to the 0 terminal of the flip-flop 38, and the other terminal of the resistor 76 is connected to a juncture point 78 between a pair of resistors 80, 82.

The other terminal of the resistor 80 is connected to the 0 terminal of the flip-flop 40, and the other terminal of the resistor 82 is connected to a juncture point 84 between a pair of resistors 86, 88. The other terminal of the resistor 86 is connected to the 0 terminal of the flip-flop 42 and the other terminal of the resistor 88 is connected through a resistor 90 to the 0 terminal of flip-flop 44. Also, a juncture point 91 between the resistor 88 and the resistor 90 is connected to the "non-inverting" input terminal of the amplifier 24.

The inverting input terminal of the amplifier 24 is connected through a resistor 92 to the positive 5 volt supply source, and the output terminal of this amplifier is fed back through a resistor 94 to the inverting input terminal of the amplifier.

The output terminal of the amplifier 24 is also coupled through a resistor 96 to the inverting input terminal of a comparator 28. A parallel-connected resistor 98 and capacitor 100 are connected across the input terminals of the comparator 28, and the non-inverting input terminal of the comparator is connected through a resistor 102 to the movable arm of the potentiometer P-1.

The output terminal of the comparator 28 is fed back through a resistor 103 to the non-inverting input terminal of the comparator, and the output terminal of the comparator is also connected to the input terminal of another amplifier 106. The output terminal of the amplifier 106 is connected to the scan and indexing control circuit 23. This output terminal is also fed back and connected to the "reset" terminal of the flip-flop FF-1.

The right margin limit set switch RS-1 is also a momentary single-pole switch having one of its terminals connected directly to ground and the other terminal connected to the set terminal of the flip-flop FF-2. The flip-flop FF-2 is comprised of a pair of OR gates 131, 132, each having one of its output terminals fed back to one of the input terminals of the other OR gate. The output terminals of the flip-flop FF-2 is connected to the input terminal of the counter C-2 which is also comprised of six J-K flip-flops 134, 136, 138, 140, 142, 144. The output terminal of the flip-flop FF-2 is connected in common to the J and K terminals of the J-K flip-flop 134, and the 1 terminal of each of the flip-flops 134 through 142 are respectively connected to the toggle terminal of the following flip-flop.

The toggle terminal of the J-K flip-flop 134 is also connected to the output terminal of the oscillator circuit 0-1. the output signals developed by the oscillator circuit are also applied through the amplifier 63 to the toggle terminal of the J-K flip-flop 134. The reset terminals of lthe flip-flops 134 through 144 are connected in common to the set terminal of the flip-flop FF-2.

The 1 terminals of each of the flip-flops 134 through 144 are connected to the digital-to-analog converter DA-2. The digital-to-analog converter DA-2 is also generally comprised of a resistive ladder network. More particularly, the 1 terminal of the flip-flop 134 is connected through a resistor 164 to a juncture point 165 between a pair of resistors 166 and 168. The other terminal of resistor 166 is connected directly to the positive 5 volt supply source, and the other terminal of the resistor 168 is connected to a juncture point 167 between another pair of resistors 170, 172.

The other terminal of the resistor 170 is connected to the 1 terminal of the flip-flop 136, and the other terminal of the resistor 172 is connected to a juncture point 173 between a pair of resistors 174, 176. The other terminal of the resistor 174 is connected to the 1 terminal of the flip-flop 138, and the other terminal of the resistor 176 is connected to a juncture point 178 between a pair of resistors 180, 182.

The other terminal of the resistor 180 is connected to the 1 terminal of the flip-flop 140, and the other terminal of the resistor 182 is connected to a juncture point 184 between a pair of resistors 186, 188. The other terminal of the resistor 186 is connected to the 1 terminal of the flip-flop 142 and the other terminal of the resistor 188 is connected through a resistor 190 to the 1 terminal of the flip-flop 144. Also, a juncture point 191 between the resistor 188 and the resistor 190 is connected to the non-inverting input terminal of the amplifier 26.

The inverting input terminal of the amplifier 26 is connected through a resistor 192 to the positive 5 volt supply source, and the output terminal of this amplifier is fed back through a resistor 194 to the inverting input terminal of the amplifier.

The output terminal of the amplifier 26 is also coupled through a resistor 196 to the non-inverting input terminal of the comparator 130. A parallel-connected resistor 198 and cpacitor 200 are connected across the input terminals of the comparator 30, and the inverting input terminal of the comparator is connected through a resistor 202 to the movable arm of the potentiometer P-1.

The output terminal of the comparator 30 is fed back through a resistor 204 to the inverting input terminal of the comparator, and the output terminal of the comparator is also connected to the input terminal of another amplifier 206. The output terminal of the amplifier 206 is connected to the scan and indexing control circuit 23. This output terminal is also fed back and connected to the reset terminal of the flip-flop FF-2.

In the operation of the automatic limit switch system, the scintillation probe 17 is moved to a position chosen to be either the right or left extremity of travel of the probe. Since the boom 22 is mechanically coupled to the movable arm of the potentiometer P-1, the potentiometer develops an analog voltage having a value which is representative of the position of the scintillation probe.

If the probe is moved to the desired right extremity of travel, the right margin set switch RS-1 is depressed to reset the flip-flop FF-2 which in turn resets the J-K flip-flops 134 through 144. When the switch RS-1 is released, clocking pulses from the astable multivibrator oscillator 0-1 are applied to the toggle terminal of the J-K flip-flop 134. These clocking pulses cause the six stage counter C-2 to commence counting.

The signals which are developed at the output terminals of the counter C-2 are applied to the digital-to-analog converter DA-2 to thereby develop an analog signal representative of the number of pulses which have been counted. The analog signal developed by the digital-to-analog converter DA-2 is then amplified by the amplifier 26 and is applied to the non-inverting input terminal of the comparator 30.

When the counter C-2 develops a signal through the digital-to-analog converter DA-2 and amplifier 26 which is slightly greater than the signal developed by the potentiometer P-1, the comparator 30 is actuated from one state to the other state. Upon actuation of the comparator 30, a signal is applied through the amplifier 206 back to the flip-flop FF-2 to reset the flip-flop and terminate the counting operation.

Upon termination of the counting operation, the signal applied to the non-inverting input terminal of the comparator 30 becomes a reference signal to prevent travel of the boom past the position of the right margin.

In order to set the left limit of travel, or margin, the scintillation probe is moved to a desired left extremity of travel, and the left margin selector switch LS-1 is depressed. The left limit reference signal is then obtained in a manner similar to that described previously with respect to the right limit of travel signal and is applied to the inverting input terminal of the comparator 28.

Once the limits of travel or margins have been set, the scanner is energized for normal operation. As the scintillation probe moves to an extremity of travel, either right or left, the signal developed by the potentiometer P-1 attains a value sufficient to actuate either the comparator 28 or the comparator 30 depending upon the direction of travel. Once the appropriate comparator has been actuated, the output signal from the comparator is applied to the scan and index control circuit 23 to terminate travel in the direction of travel, index the boom for one increment of travel in a direction perpendicular to the scan direction, and commence a scan in a reverse direction.

Although one embodiment of the invention has been described and illustrated, it is apparent to one skilled in the art that various changes and modifications may be made without departing from the spirit and scope of the invention.

We claim:

1. In a scintillation scanning device comprising a housing structure, a scan boom movably supported by said housing structure, reciprocal drive means being operatively connected to said boom for reciprocally driving said boom in a longitudinal scanning path, transverse drive means being operatively connected to said boom for moving said boom transversely in a scan indexing path, a radiation detection element supported at one end of said boom, the improvement in an automatic limit of travel system comprising:
    position responsive means for developing a monitor signal having a value representative of the position of the scan boom;
    reference signal circuit means for developing a limit signal having a value representative of the position of a limit of travel of said scan boom;
    comparator circuit means coupled to said position responsive means and to said reference signal circuit means for developing a control signal when the value of a said monitor signal attains a predetermined level with respect to the value of a said limit signal, said comparator circuit means being coupled to said reciprocal drive means and said transverse drive means for applying a control signal to said reciprocal and transverse drive means to thereby terminate travel of and index said boom.

2. An apparatus as defined in claim 1 including second reference signal circuit means for developing a second limit signal having a value representative of the position of a second limit of travel of said scan boom; second comparator circuit means coupled to said second position responsive means and to said reference signal circuit means for developing a second control signal when the value of a said monitor signal attains a predetermined level with respect to the value of a said second limit signal, said second comparator circuit means being coupled to said reciprocal drive means and said transverse drive means for applying a control signal to said reciprocal and transverse drive means to thereby terminate travel of and index said boom.

3. An apparatus as defined in claim 2 wherein said reference signal circuit means includes clocking circuit means for developing a train of pulses, counting circuit means coupled to said clocking circuit means, and actuator means for actuating said counting circuit means to receive a said train of clocking pulses.

4. An apparatus as defined in claim 3 wherein said counting circuit means includes binary counter means, and said reference signal circuit means includes digital-to-analog converter means interposed between said binary counter means and said comparator circuit means for converting signals developed by said binary counter means to signals of analog form.

5. An apparatus as defined in claim 4 wherein said reference signal circuit means includes gating means for deactivating said counting circuit means after said counting circuit means has been activated when the value of a signal developed by said digital-to-analog converter means attains a predetermined value with respect clocking the value of said limit signal.

6. An apparatus as defined in claim 1 wherein said reference signal circuit means includes clocking circuit means for developing a train of pulses, counting circuit means coupled to said clocking circuit means, and actuator means for actuating said counting circuit means to receive a said train of clocingin pulses.

7. An apparatus as defined in claim 6 wherein said counting circuit means includes binary counter means, and said reference signal circuit means includes digital-to-analog converter means interposed between said binary counter means and said comparator circuit means for converting signals developed by said binary counter means to signals of analog form.

8. An apparatus as defined in claim 7 wherein said reference signal circuit means includes gating means for deactivating said counting circuit means after said counting circuit means has been activated when the value of a signal developed by said digital-to-analog converter means attains a predetermined value with respect to the value of a said limit signal.

9. A method of setting the limit of travel of a radiation detector in a scintillation device comprising the steps of:
    positioning the radiation detector at one selected extremity of travel;
    generating a limit signal having a value representative of the selected postion of the radiation detector;
    generating a reference signal having a value of a predetermined level with respect to the value of the limit signal;
    moving the radiation detector to a position away from said selected extremity position;
    driving the radiation detector in a direction toward said selected extremity position;
    developing a position signal having a value representative of the position of the radiation detector;
    comparing the value of a position signal with the value of a reference signal;
    terminating movement of the radiation detector when the value of a position signal attains a predetermined value with respect to the value of a reference signal.

10. A method of setting the limits of travel of a radiation detector in a scintillation device comprising the steps of:
- positioning the radiation detector at a first extremity of travel;
- generating a first limit signal having a value representative of the first selected position of the radiation detector;
- generating a first reference signal having a value of a predetermined level with respect to the value of the first limit signal;
- positioning the radiation detector at a second selected extremity of travel;
- generating a second limit signal having a value representative of the second selected position of the radiation detector;
- generating a second reference signal having a value of a predetermined level with respect to the value of the second limit signal;
- driving the radiation detector in a direction toward said first selected extremity position;
- developing a position signal having a value representative of the position of the radiation detector;
- comparing the value of the position signal with the value of the first reference signal;
- terminating movement of the radiation detector when the value of a postion signal attains a predetermined value with respect to the value of the first reference signal;
- driving the radiation detector in a direction away from said first selected extremity position and toward said second selected extremity position;
- comparing the value of the position signal with the value of the second reference signal; and,
- terminating movement of the radiation detector when the value of the position signal attains a predetermined value with respect to the value of the second reference signal.

11. A scintillation scanning device comprising a housing structure, a boom movably supported by said housing structure, reciprocal drive means operatively connected to said boom for reciprocally driving said boom along a longitudinal scanning path, transverse drive means operatively connected to said boom for moving said boom transversely along a scan indexing path, a radiation detection element supported at one end of said boom, the improvement in an automatic limit of travel system comprising:
- position responsive means for developing a monitor signal having a value representative of the actual position of the boom;
- reference signal circuit means for developing a limit signal having a value resentative of the position of a selected limit of travel of said boom;
- comparator circuit means coupled to said position responsive means and said reference signal circuit means for developing a control signal when the value of a said monitor signal attains a predetermined level with respect to the value of a said limit signal; and,
- control circuit means coupled to said comparator circuit means for, upon receipt of a control signal, controlling said reciprocal drive means to terminate travel of said boom.

12. An apparatus as defined in claim 11 including second reference signal circuit means for developing a second limit signal having a value representative of the position of a second limit of travel of said scan boom; second comparator circuit means coupled to said second position responsive means and to said reference signal circuit means for developing a second control signal when the value of a said monitor signal attains a predetermined level with respect to the value of a said second limit signal, said second comparator circuit means being coupled to said reciprocal drive means and said transverse drive means for applying a control signal to said reciprocal and transverse drive means to thereby terminate travel of said boom 13. An apparatus as defined in claim 12 wherein said reference signal circuit means includes clocking circuit means for developing a train of pulses, counting circuit means coupled to said clocking circuit means, and actuator means for actuating said counting circuit means to receive a said train of clocking pulses.

14. An apparatus as defined in claim 13 wherein said counting circuit means includes binary counter means, and said reference signal circuit means includes digital-to-analog converter means interposed between said binary counter means and said comparator circuit means for converting signals developed by said binary counter means to signals of analog form.

* * * * *